(12) United States Patent
McLaughlin, Jr.

(10) Patent No.: US 11,969,308 B1
(45) Date of Patent: Apr. 30, 2024

(54) SPINNING ELECTRIC TOOTHBRUSH

(71) Applicant: Henry McLaughlin, Jr., Charlotte, NC (US)

(72) Inventor: Henry McLaughlin, Jr., Charlotte, NC (US)

( * ) Notice: Subject to any disclaimer, the term of this patent is extended or adjusted under 35 U.S.C. 154(b) by 352 days.

(21) Appl. No.: 17/493,951

(22) Filed: Oct. 5, 2021

(51) Int. Cl.
| | |
|---|---|
| *A61C 17/26* | (2006.01) |
| *A46B 5/00* | (2006.01) |
| *A46B 9/04* | (2006.01) |
| *A46B 9/10* | (2006.01) |
| *A46B 13/02* | (2006.01) |
| *A46B 15/00* | (2006.01) |
| *A61C 17/22* | (2006.01) |
| *H02K 11/00* | (2016.01) |
| *H02K 11/33* | (2016.01) |

(52) U.S. Cl.
CPC ............ *A61C 17/26* (2013.01); *A46B 5/0012* (2013.01); *A46B 9/04* (2013.01); *A46B 9/10* (2013.01); *A46B 13/02* (2013.01); *A46B 15/0004* (2013.01); *A61C 17/221* (2013.01); *H02K 11/0094* (2013.01); *H02K 11/33* (2016.01); *H01M 2220/30* (2013.01)

(58) Field of Classification Search
CPC ......... A61C 17/26; A46B 5/0012; A46B 9/04; A46B 9/10
See application file for complete search history.

(56) References Cited

U.S. PATENT DOCUMENTS

| | | | |
|---|---|---|---|
| 2,486,203 | A | 10/1949 | Pieper |
| 4,796,323 | A | 1/1989 | Benz |
| D499,884 | S | 12/2004 | Geoffrey |
| 9,295,536 | B2 | 3/2016 | Kwon |
| 10,864,066 | B2 * | 12/2020 | Lee .................... A46B 15/0075 |
| 2009/0265869 | A1 | 10/2009 | Gonzalez |
| 2021/0093430 | A1 | 4/2021 | Huang |

FOREIGN PATENT DOCUMENTS

WO 2009130678 10/2009

* cited by examiner

*Primary Examiner* — Shay Karls

(57) ABSTRACT

The spinning electric toothbrush is a medical device. The spinning electric toothbrush is adapted for use on the teeth of a patient. The spinning electric toothbrush comprises a brush structure, an electric motor, a control circuit, and a housing. The housing contains the brush structure, the electric motor, and the control circuit. The electric motor rotates the brush structure. The control circuit controls the operation of the electric motor. The control circuit provides the electric energy necessary to power the operation of the electric motor.

12 Claims, 4 Drawing Sheets

SPINNING ELECTRIC TOOTHBRUSH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of brushes, more specifically, arrangements of the bristles in a brush body.

SUMMARY OF INVENTION

The spinning electric toothbrush is a medical device. The spinning electric toothbrush is adapted for use on the teeth of a patient. The spinning electric toothbrush comprises a brush structure, an electric motor, a control circuit, and a housing. The housing contains the brush structure, the electric motor, and the control circuit. The electric motor rotates the brush structure. The control circuit controls the operation of the electric motor. The control circuit provides the electric energy necessary to power the operation of the electric motor.

These together with additional objects, features and advantages of the spinning electric toothbrush will be readily apparent to those of ordinary skill in the art upon reading the following detailed description of the presently preferred, but nonetheless illustrative, embodiments when taken in conjunction with the accompanying drawings.

In this respect, before explaining the current embodiments of the spinning electric toothbrush in detail, it is to be understood that the spinning electric toothbrush is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the spinning electric toothbrush.

It is therefore important that the claims be regarded as including such equivalent construction insofar as they do not depart from the spirit and scope of the spinning electric toothbrush. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
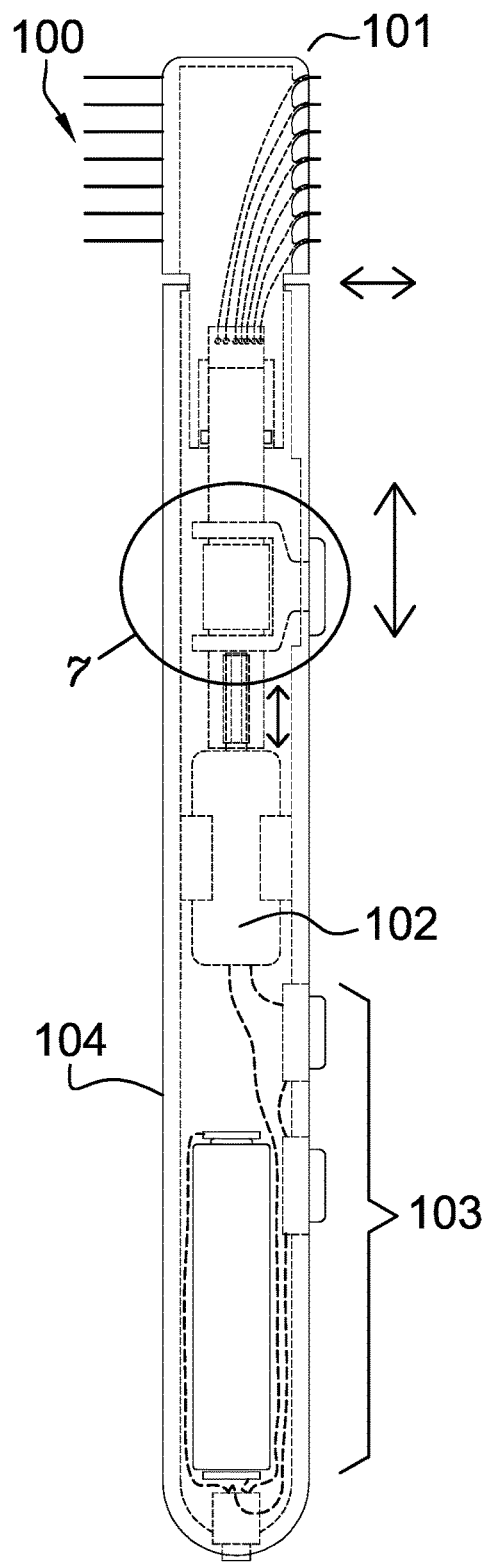
FIG. 1 is a front view of an embodiment of the disclosure.
Figure 2:
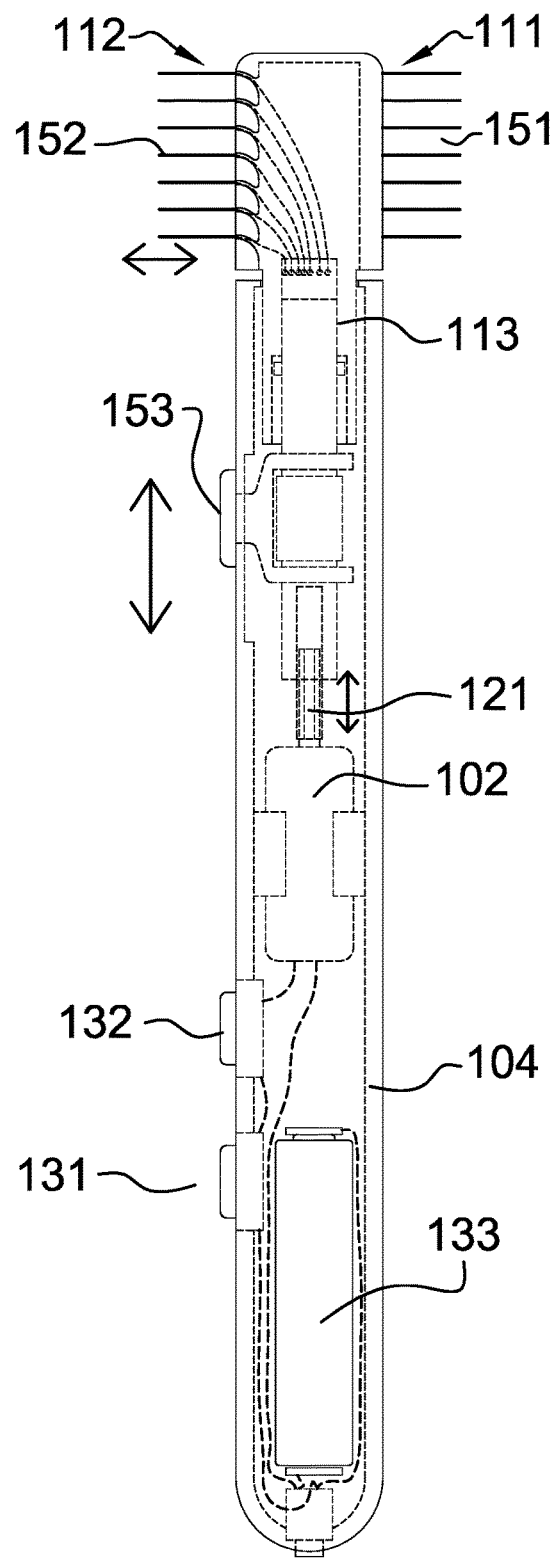
FIG. 2 is a rear view of an embodiment of the disclosure.
Figure 3:
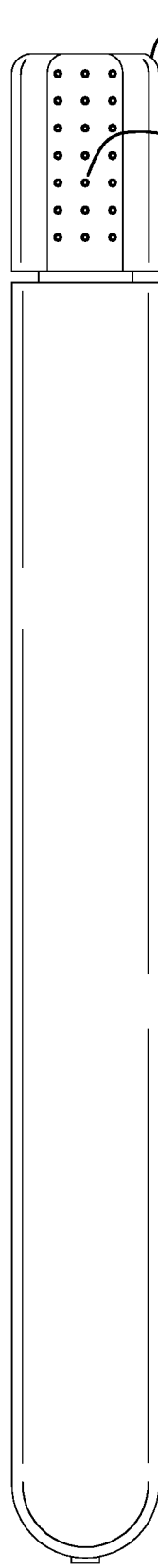
FIG. 3 is a side view of an embodiment of the disclosure.
Figure 4:
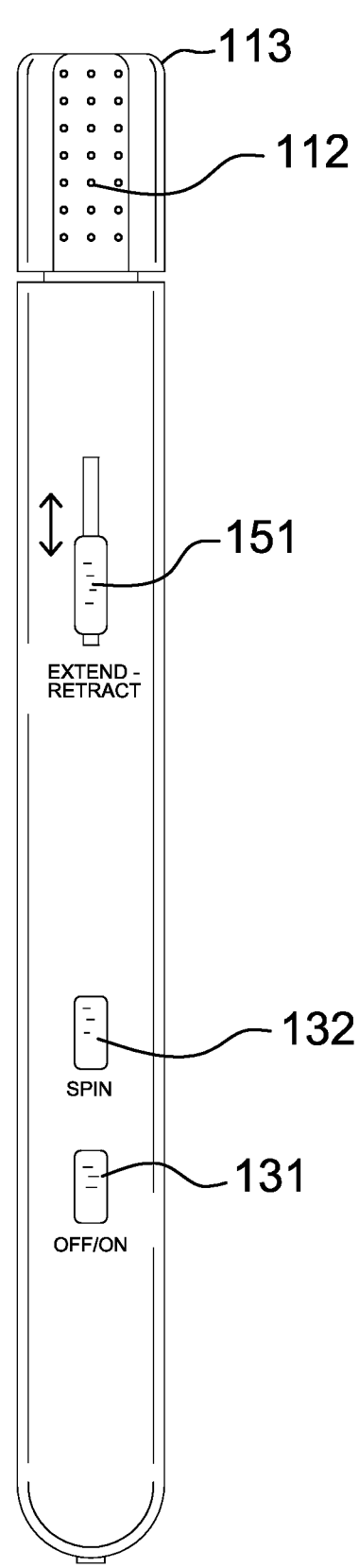
FIG. 4 is a reverse side view of an embodiment of the disclosure.
Figure 5:
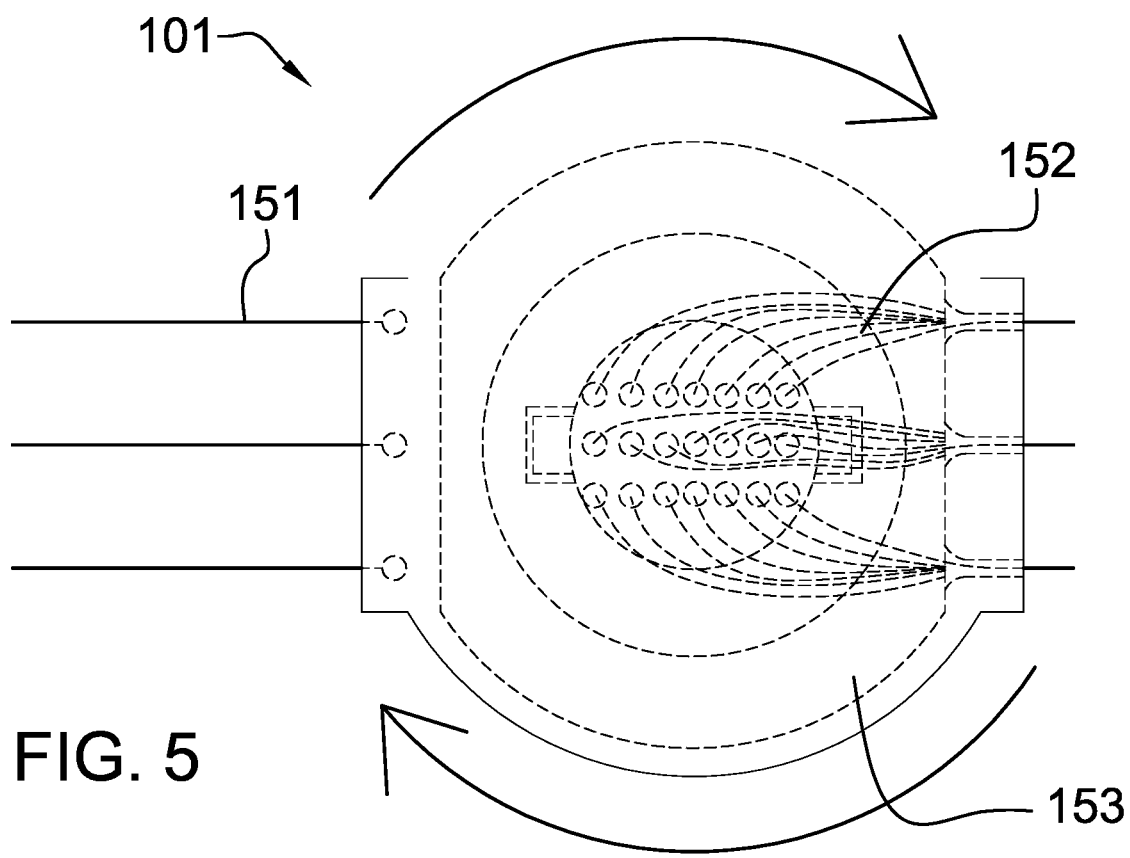
FIG. 5 is a top view of an embodiment of the disclosure.
Figure 6:
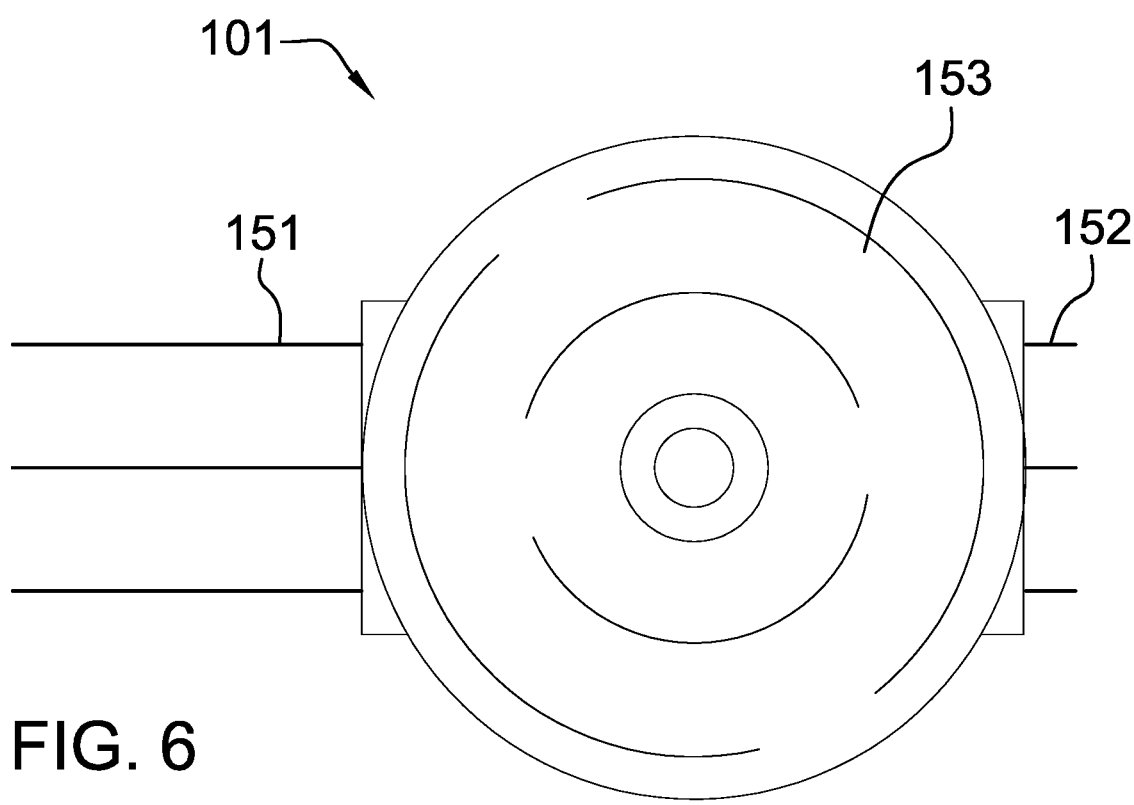
FIG. 6 is a bottom view of an embodiment of the disclosure.
Figure 7:
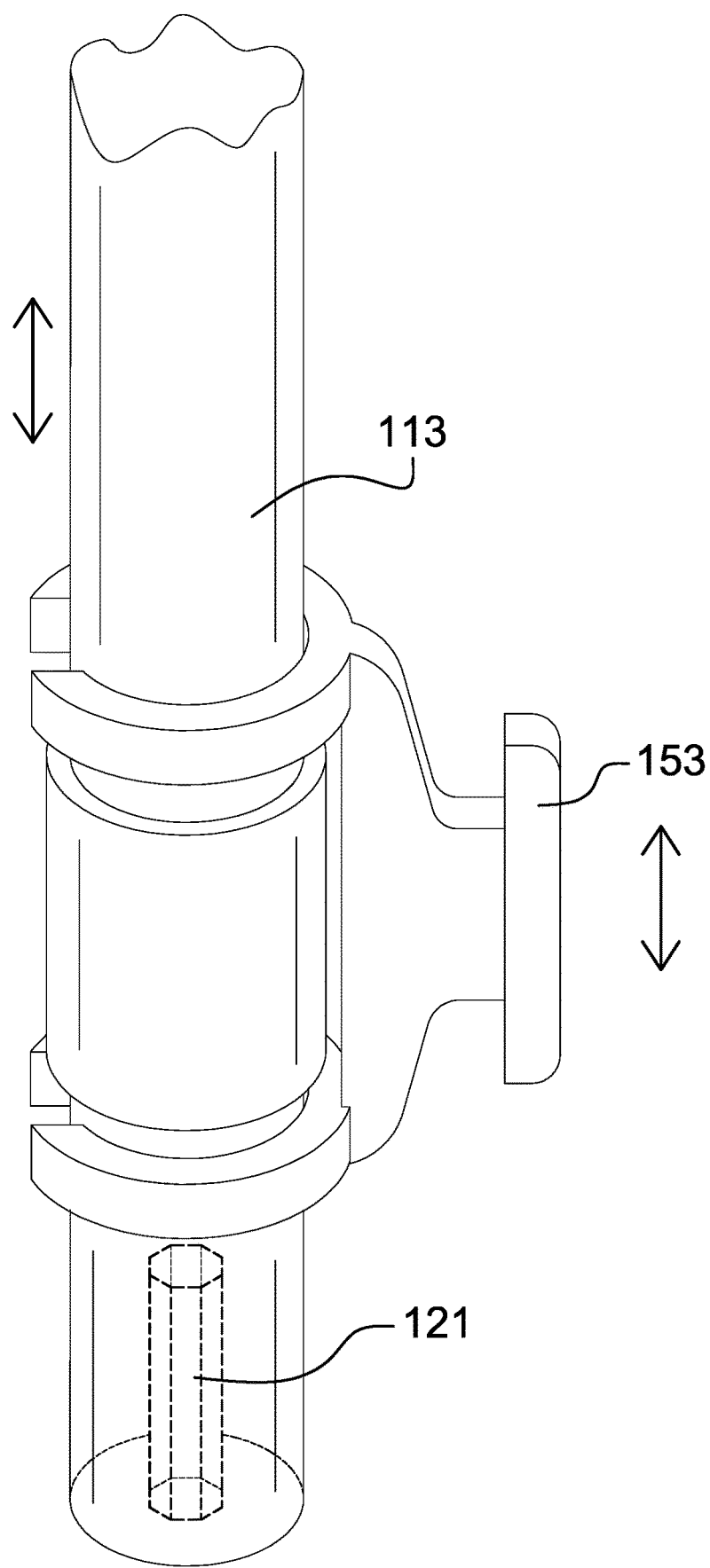
FIG. 7 is a detail view of an embodiment of the disclosure.

Detailed reference will now be made to one or more potential embodiments of the disclosure, which are illustrated in FIGS. 1 through 7.

The spinning electric toothbrush 100 (hereinafter invention) is a medical device. The invention 100 is adapted for use on the teeth of a patient. The invention 100 comprises a master brush structure 101, an electric motor 102, a control circuit 103, and a housing structure 104. The housing structure 104 contains the master brush structure 101, the electric motor 102, and the control circuit 103. The electric motor 102 rotates the master brush structure 101. The control circuit 103 controls the operation of the electric motor 102. The control circuit 103 provides the electric energy necessary to power the operation of the electric motor 102.

The housing structure 104 is a rigid structure. The housing structure 104 is a hollow structure. The housing structure 104 is a prism shaped structure. The housing structure 104 contains the master brush structure 101, the electric motor 102 and the control circuit 103. The housing structure 104 is formed with all apertures and form factors necessary to allow the housing structure 104 to accommodate the use and operation of the master brush structure 101, the electric motor 102 and the control circuit 103. Methods to form a housing structure 104 suitable for the purposes described in this disclosure are well-known and documented in the mechanical arts.

The master brush structure 101 forms the working element of the tool formed by the invention 100. The master brush structure 101 is a rotating structure. The master brush structure 101 forms a cleaning surface used to clean the teeth of a patient. The master brush structure 101 mounts on the housing structure 104 such that the master brush structure 101 is accessible to a patient from the exterior of the housing structure 104. The master brush structure 101 attaches to the electric motor 102 such that the rotation of the electric motor 102 rotates the master brush structure 101. The master brush structure 101 comprises a first brush structure 111, a second brush structure 112, and a rotating bristle base 113.

The first brush structure 111 is a brush. The first brush structure 111 forms a portion of the working element formed by the invention 100. The first brush structure 111 is formed as a toothbrush. The first brush structure 111 forms a scrubbing surface used to clean the dentition of a patient. The first brush structure 111 further comprises a first bristle set 151.

The first bristle set 151 forms a portion of the scrubbing surface formed by the working element of the invention 100. The first bristle set 151 attaches to the rotating bristle base 113 such that the first bristle set 151 rotates with the rotation of the rotating bristle base 113. The first bristle set 151 attaches to the rotating bristle base 113 such that a portion of each bristle selected from the first bristle set 151 extends beyond the exterior surfaces of the rotating bristle base 113 and the housing structure 104. Each bristle selected from the first bristle set 151 is a flexible structure.

The first brush structure 111 is an adjustable structure. By adjustable structure is meant that the span of the exterior length of each bristle selected from the first bristle set 151 of the first brush structure 111 is adjustable. By the exterior length is meant the span of the length of each bristle selected from the first brush structure 111 as measured on the exterior side of the invention 100.

The second brush structure 112 is a brush. The second brush structure 112 forms a portion of the working element formed by the invention 100. The second brush structure 112 is formed as a toothbrush. The second brush structure 112 forms a scrubbing surface used to clean the dentition of a patient. The second brush structure 112 further comprises a second bristle set 152.

The second bristle set 152 forms a portion of the scrubbing surface formed by the working element of the invention 100. The second bristle set 152 attaches to the rotating bristle base 113 such that the second bristle set 152 rotates with the rotation of the rotating bristle base 113. The second bristle set 152 attaches to the rotating bristle base 113 such that a portion of each bristle selected from the second bristle set 152 extends beyond the exterior surfaces of the rotating bristle base 113 and the housing structure 104.

Each bristle selected from the second bristle set 152 is a flexible structure. The second brush structure 112 is a dynamic structure. By dynamic structure is meant that the span of the exterior length of each bristle selected from the second bristle set 152 of the second brush structure 112 is adjustable. By the exterior length is meant the span of the length of each bristle selected from the second brush structure 112 as measured on the exterior side of the invention 100.

The rotating bristle base 113 is a mechanical structure. The rotating bristle base 113 is a roughly prism shaped structure. The rotating bristle base 113 is a rotating structure. The rotating bristle base 113 mounts in the hollow interior of the housing structure 104 such that the rotating bristle base 113 rotates within the housing structure 104. The rotating bristle base 113 mounts in the hollow interior of the housing structure 104 such that a portion of the rotating bristle base 113 extends beyond the exterior surfaces of the housing structure 104.

The first bristle set 151 attaches to the rotating bristle base 113 such that each bristle of the first bristle set 151 extends radially away from the center axis of the prism structure of the housing structure 104. The second bristle set 152 attaches to the rotating bristle base 113 such that each bristle of the second bristle set 152 extends radially away from the center axis of the prism structure of the rotating bristle base 113.

The rotating bristle base 113 forms a composite prism structure within the housing structure 104. The rotating bristle base 113 mounts within the housing structure 104 such that a portion of the rotating bristle base 113 moves within the housing structure 104 in a direction parallel to the center axis of the housing structure 104. The second bristle set 152 attaches to the moving portion of the rotating bristle base 113 such that the movement of the rotating bristle base 113 within the housing structure 104 changes the span of the exterior length of each bristle selected from the second bristle set 152.

The rotating bristle base 113 further comprises a thumb slide 153. The thumb slide 153 is the structure that changes the exterior length of the second bristle set 152. The thumb slide 153 attaches to the moving portion of the rotating bristle base 113. The thumb slide 153 forms a grip used to move the moving portion of the rotating bristle base 113 within the housing structure 104.

The electric motor 102 is an electrically powered device. The electric motor 102 is a rotating structure. The electric motor 102 converts electrical energy into rotational energy. The electric motor 102 attaches to the master brush structure 101 such that the rotation of the electric motor 102 rotates the master brush structure 101. The control circuit 103 provides the electric energy required to operate the electric motor 102. The control circuit 103 controls the operation of the electric motor 102. The electric motor 102 mounts in the hollow interior of the housing structure 104. The electric motor 102 further comprises a motor shaft 121.

The motor shaft 121 is a rigid structure. The motor shaft 121 is a prism shaped structure. The motor shaft 121 attaches to the electric motor 102 such that the center of rotation of the electric motor 102 aligns with the center axis of the prism structure of the motor shaft 121. The motor shaft 121 attaches to the rotating bristle base 113 such that the rotation of the motor shaft 121 rotates the rotating bristle base 113 around a center of rotation that aligns with the center axis of the rotating bristle base 113. These linkages ensure that the rotation of the motor shaft 121 rotates the first bristle set 151 and the second bristle set 152.

The control circuit 103 is an electric circuit. The control circuit 103 is an electrochemical device. The control circuit 103 generates the electric energy required to power the electric motor 102. The control circuit 103 converts chemical potential energy into the electric energy used to power the electric motor 102. The control circuit 103 controls the operation of the electric motor 102 by controlling the flow of electric energy through the electric motor 102. The control circuit 103 mounts in the hollow interior of the housing structure 104. The control circuit 103 comprises a master switch 131, a motor switch 132, and a battery 133.

The master switch 131 is an electric switch. The master switch 131 is a maintained switch. The master switch 131 is wired in series between the battery 133 and the motor switch 132. The master switch 131 controls the flow of electric energy out of the battery 133. The master switch 131 forms the power switch for the invention 100.

The motor switch 132 is an electric switch. The motor switch 132 is selected from the group consisting of a maintained switch and a momentary switch. The motor switch 132 is wired in series between the motor switch 132 and the electric motor 102. The motor switch 132 controls the flow of electric energy into the electric motor 102. The motor switch 132 controls the operation of the electric motor 102.

The battery 133 is an electrochemical device. The battery 133 converts chemical potential energy into the electrical energy used to power the electric motor 102.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Battery: As used in this disclosure, a battery is a chemical device consisting of one or more cells, in which chemical energy is converted into electricity and used as a source of power. Batteries are commonly defined with a positive terminal and a negative terminal.

Brush: As used in this disclosure, a brush is a tool comprising a plurality of bristles set into a handle or a base that is used for grooming, sweeping, smoothing, scrubbing, or painting.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Dentition: As used in this disclosure, a dentition refers to a set of teeth and a set of descriptive characteristics of the set of teeth especially with regard to their number, kind, arrangement, and condition.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Exterior: As used in this disclosure, the exterior is used as a relational term that implies that an object is not contained within the boundary of a structure or a space.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Housing: As used in this disclosure, a housing is a rigid structure that encloses and protects one or more devices.

Interior: As used in this disclosure, the interior is used as a relational term that implies that an object is contained within the boundary of a structure or a space.

Maintained Switch: A used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Patient: As used in this disclosure, a patient is a person who is designated to receive a medical treatment, therapy, or service. The term patient may be extended to an animal when used within the context of the animal receiving veterinary treatment or services.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tool: As used in this disclosure, a tool is a device, an apparatus, or an instrument that is used to carry out an activity, operation, or procedure. A tool generally comprises a working element and a handle.

Toothbrush: As used in this disclosure, a toothbrush is a brush that is used to clean the teeth of a patient.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A spinning electric toothbrush comprising
a master brush structure, an electric motor, a control circuit, and a housing structure;
wherein the housing structure contains the master brush structure, the electric motor, and the control circuit;
wherein the master brush structure comprises a first brush structure, a second brush structure, and a rotating bristle base;
wherein the first bristle set attaches to the rotating bristle base;
wherein the second bristle set attaches to the rotating bristle base;
wherein a span of an exterior length of each bristle selected from the first bristle set of the first brush structure is not adjustable;
wherein by the exterior length is meant the span of the length of each bristle selected from the first brush structure as measured on the exterior side of the spinning electric toothbrush;
wherein the second brush structure is a dynamic structure;
wherein by dynamic structure is meant that the span of the exterior length of each bristle selected from the second bristle set of the second brush structure is adjustable;
wherein by the exterior length is meant the span of the length of each bristle selected from the second brush structure as measured on the exterior side of the spinning electric toothbrush.

2. The spinning electric toothbrush according to claim 1
wherein the spinning electric toothbrush is a medical device;
wherein the electric motor rotates the master brush structure;
wherein the control circuit controls the operation of the electric motor;
wherein the control circuit provides the electric energy necessary to power the operation of the electric motor.

3. The spinning electric toothbrush according to claim 2
wherein the housing structure is a rigid structure;
wherein the housing structure is a hollow structure.

4. The spinning electric toothbrush according to claim 3
wherein the master brush structure forms the working element of the tool formed by the spinning electric toothbrush;
wherein the master brush structure is a rotating structure;
wherein the master brush structure forms a cleaning surface;
wherein the master brush structure mounts on the housing structure such that the master brush structure is accessible from the exterior of the housing structure;
wherein the master brush structure attaches to the electric motor such that the rotation of the electric motor rotates the master brush structure.

5. The spinning electric toothbrush according to claim 4
wherein the electric motor is an electrically powered device;
wherein the electric motor is a rotating structure;
wherein the electric motor converts electrical energy into rotational energy;
wherein the electric motor attaches to the master brush structure such that the rotation of the electric motor rotates the master brush structure;
wherein the electric motor mounts in the housing structure.

6. The spinning electric toothbrush according to claim 5
wherein the control circuit is an electric circuit;
wherein the control circuit is an electrochemical device;
wherein the control circuit generates the electric energy required to power the electric motor;
wherein the control circuit converts chemical potential energy into the electric energy used to power the electric motor;
wherein the control circuit controls the operation of the electric motor by controlling the flow of electric energy through the electric motor;
wherein the control circuit mounts in the housing structure.

7. The spinning electric toothbrush according to claim 6
wherein the first brush structure is a brush;
wherein the first brush structure forms a portion of the working element formed by the spinning electric toothbrush;
wherein the first brush structure is formed as a toothbrush;
wherein the first brush structure forms a scrubbing surface used to clean the dentition of a patient;
wherein the first brush structure further comprises a first bristle set;
wherein the first bristle set forms a portion of the scrubbing surface formed by the working element of the spinning electric toothbrush;
wherein the first bristle set attaches to the rotating bristle base such that the first bristle set rotates with the rotation of the rotating bristle base;
wherein the first bristle set attaches to the rotating bristle base such that a portion of each bristle selected from the first bristle set extends beyond the exterior surfaces of the rotating bristle base and the housing structure;
wherein each bristle selected from the first bristle set is a flexible structure.

8. The spinning electric toothbrush according to claim 7
wherein the second brush structure is a brush;
wherein the second brush structure forms a portion of the working element formed by the spinning electric toothbrush;
wherein the second brush structure is formed as a toothbrush;
wherein the second brush structure forms a scrubbing surface used to clean the dentition of a patient;
wherein the second brush structure further comprises a second bristle set;
wherein the second bristle set forms a portion of the scrubbing surface formed by the working element of the spinning electric toothbrush;

wherein the second bristle set attaches to the rotating bristle base such that the second bristle set rotates with the rotation of the rotating bristle base;

wherein the second bristle set attaches to the rotating bristle base such that a portion of each bristle selected from the second bristle set extends beyond the exterior surfaces of the rotating bristle base and the housing structure;

wherein each bristle selected from the second bristle set is a flexible structure.

9. The spinning electric toothbrush according to claim 8 wherein the rotating bristle base is a mechanical structure;

wherein the rotating bristle base is a rotating structure;

wherein the rotating bristle base mounts in the hollow interior of the housing structure such that the rotating bristle base rotates within the housing structure;

wherein the rotating bristle base mounts in the hollow interior of the housing structure such that a portion of the rotating bristle base extends beyond the exterior surfaces of the housing structure;

wherein the first bristle set attaches to the rotating bristle base such that each bristle of the first bristle set extends radially away from the center axis of the housing structure;

wherein the second bristle set attaches to the rotating bristle base such that each bristle of the second bristle set extends radially away from the center axis of the rotating bristle base;

wherein the rotating bristle base forms a composite structure within the housing structure;

wherein the rotating bristle base mounts within the housing structure such that a portion of the rotating bristle base moves within the housing structure in a direction parallel to the center axis of the housing structure;

wherein the second bristle set attaches to the moving portion of the rotating bristle base such that the movement of the rotating bristle base within the housing structure changes the span of the exterior length of each bristle selected from the second bristle set.

10. The spinning electric toothbrush according to claim 9 wherein the rotating bristle base further comprises a thumb slide;

wherein the thumb slide is the structure that changes the exterior length of the second bristle set;

wherein the thumb slide attaches to the moving portion of the rotating bristle base;

wherein the thumb slide forms a grip used to move the moving portion of the rotating bristle base within the housing structure.

11. The spinning electric toothbrush according to claim 10 wherein the electric motor further comprises a motor shaft;

wherein the motor shaft is a rigid structure;

wherein the motor shaft attaches to the electric motor such that the center of rotation of the electric motor aligns with the center axis of the motor shaft;

wherein the motor shaft attaches to the rotating bristle base such that the rotation of the motor shaft rotates the rotating bristle base around a center of rotation that aligns with the center axis of the rotating bristle base.

12. The spinning electric toothbrush according to claim 11 wherein the control circuit comprises a master switch, a motor switch, and a battery;

wherein the master switch is an electric switch;

wherein the master switch is a maintained switch;

wherein the master switch is wired in series between the battery and the motor switch;

wherein the master switch controls the flow of electric energy out of the battery;

wherein the motor switch is an electric switch;

wherein the motor switch is selected from the group consisting of a maintained switch and a momentary switch;

wherein the motor switch is wired in series between the motor switch and the electric motor;

wherein the motor switch controls the flow of electric energy into the electric motor;

wherein the battery is an electrochemical device;

wherein the battery converts chemical potential energy into the electrical energy used to power the electric motor.

* * * * *